United States Patent Office 3,314,743
Patented Apr. 18, 1967

3,314,743
PROCESSES FOR TREATMENT OF PREFORMED ARTICLES OF OLEFIN POLYMERS AND RESULTING PRODUCTS
Domenick Donald Gagliardi, 185 Howland Road, East Greenwich, R.I. 02818
No Drawing. Filed Nov. 7, 1963, Ser. No. 322,025
13 Claims. (Cl. 8—31)

Reference is made under the provisions of 35 U.S.C. 120 to my following earlier filed applications:
S.N. 91,639—Filed Feb. 27, 1961 and now U.S. 3,098,692;
S.N. 106,173—Filed Apr. 28, 1961 and now U.S. 3,151,928;
S.N. 123,988—Filed July 14, 1961 and now U.S. 3,148,017;
S.N. 188,568—Filed Apr. 19, 1962 and now U.S. 3,145,073;
S.N. 189,280—Filed Apr. 23, 1962 and now U.S. 3,150,917;
S.N. 196,908—Filed May 23, 1962 and now U.S. 3,169,823;
S.N. 217,544—Filed Aug. 17, 1962 and now U.S. 3,169,824;
S.N. 307,610—Filed Sept. 9, 1963 and now abandoned; and
S.N. 318,507—Filed Oct. 24, 1963.

This invention relates to processes for the treatment of preformed articles of solid polyolefin materials such as filaments, yarns, films, sheets, molded articles or the like to improve the receptivity of the articles to dyes, pigments and other finishing or coating materials.

Field of invention

Solid high molecular weight olefin polymers, exemplified by such commercially available materials as polyethylene and polypropylene, are now of great economic importance because of their extensive use, dependent to a large measure on their relatively low cost of manufacture and fabrication. Continuous films, filaments and yarns formed of such olefin polymers account for much of their commercial use. However, great quantities of the polymers are also used in the fabrication of thousands upon thousands of other items by molding, extrusion, casting and other forming operations. Many of these uses require the polymers to be colored, printed or coated for ornamentation in order to promote the sale of the item or improve their customer acceptance.

The coloring of articles made of polyolefins has presented the polymer manufacturers and fabricators with some serious problems. Thus, the solid high molecular weight polyolefins are extremely inert, not appreciably effected by solvents and have a very low degree of adhesion to most materials. In dyeing, coloring or coating of polyolefins, this high degree of inertness and low adhesive qualities is a disadvantage. Actually, polyethylene, polypropylene and similar solid high molecular weight polyolefins have such a low degree of adhesion and such a high degree of repellency to water and many organic solvents that the polymers have been classified as undyeable with conventional water-soluble dye-stuffs. Pigments and other coating agents, which can be satisfactorily used to color most other types of synthetic polymers, are also generally repelled by the polyolefins.

It is possible to form colored articles of polyolefins by incorporating oil-soluble dyes or suspending pigments in the polymers, such as by melt-mixing, prior to the fabrication of the solid polymer into a final shaped article. With molded articles which can be sold in only one or a few colors, such coloring procedures are satisfactory on a commercial scale. In such instances, the molder or fabricator need use only one or two colors to make the final products and to maintain only a minimum inventory of colored items. On the other hand, this method of coloring is not feasible with films, filaments, and yarns. Here, such varieties of colors are demanded because of style, competition, customer demand or the like, it would be totally impractical for textile manufacturers, or similar fabricators of articles from continuous lengths of polyolefin materials to maintain an inventory of separate colors for every possible item made from polyolefin material. This has required a search for effective and commercially feasible methods of permitting the polyolefin material to be colored after it has been extruded, molded, or otherwise fabricated into a continuous length.

One approach to this problem has been to modify the olefin polymer as it is formed, such as by copolymerization with modifying copolymerizable materials, in order to render the resulting polymer receptive to conventional dyestuffs and coating compositions. This approach is not completely satisfactory because it substantially increases the cost of the resulting polymers, thereby detracting from one of the main features of olefin polymers, namely, low cost of production. Also, the copolymerization generally detracts from other desired physical and chemical properties of the polymers.

Another approach to the solution of this coloring problem has been to modify the surface of films, fibers or other preformed articles by chemical reaction with strong reagents or high energy radiations. For example, some success has been obtained in promoting improvement in dye receptivity of polyolefins by sulfonation of the article surfaces by strong reagents, such as oleum, concentrated sulfuric acid; nitration, such as with concentrated nitric acid; or oxidation, such as with atomic oxygen or ozone. Also, some success has been attained by irradiating the surface of the article with X-rays, gamma rays or other high energy particles or radiations. Such procedures may be satisfactory for film or other articles which present only simple surfaces, but are generally unuseable with articles of complicated surface contour, e.g., woven fabrics or the like.

Objects

A principal object of this invention is the provision of new processess of improving the receptivity of preformed articles composed of solid olefin polymers to both anionic and cationic dyes, pigments and coating materials. Further objects include:

(1) The provision of new processes for coloring films, fibers, filaments, yarn, fabrics and other preformed articles of solid olefin polymers by which the articles may be colored in deep shades with the coloring being resistant to removal by washing, dry-cleaning and other cleansing or handling operations to which the polymer article may be subjected during normal use.

(2) The provision of new procedures which may be employed by textile manufacturers, film producers or similar converters of olefin polymers for treating preformed polyolefin articles without recourse to special chemical modification of the polymer molecules or drastic pretreatment of the polymer in order to render the polymer receptive to coloring material, pigments, anti-static agents, and most coating materials.

(3) The provision of new and improved fibers, yarns, films and other preformed articles made of solid olefin polymers that may be readily colored or finished with both anionic and cationic coloring and finishing agents.

(4) The provision of processes for treatment of polyolefin articles to obtain the new articles of object 3.

(5) The provision of preformed articles of solid olefin polymers which have surfaces that appear uncolored and normal for untreated polymer, but which have a greatly improved receptivity for direct dyes, vat dyes, sulfur dyes, fiber reactive dyes, naphthol dyes, acid wool dyes, basic dyes, cationic dyes, resin bonded pigments, anti-static agents, elastomeric latices, polyhydroxylated polymers, polyamino compounds, silicone polymers, fluorocarbons, coating resins and the like.

(6) The provision of processes for improving the wash-fastness and dry-clean fastness of the coloring, anti-static properties, oil-repellency and adhesion to coating and laminating resins of solid, high molecular weight olefin polymers.

(7) The provision of methods for improving the affinity of polyolefin surfaces to both cationic and anionic agents in relatively simple fashion and without need to subject the surfaces to drastic chemical action, strong irradiation or similar operations that chemically or molecularly alter the polymer of which the surface is formed.

(8) The provision of new polyolefin treatments as outlined that may be applied without difficulty to most any form of preformed article, e.g., films fibers, spun yarns, woven and non-woven fabrics, molded articles, or the like.

(9) The provision of such polyolefin treatments which enable preformed articles of solid polyolefins to be modified so they become receptive to both anionic and cationic coloring and coating substances using readily available, relatively mild treating materials to produce the modification.

(10) The provision of new methods of rendering surfaces of preformed articles of polyolefins oil-repellent.

(11) The provision of new flame resistant polyolefin articles and methods of making them from polymer that is not normally flame resistant.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

*General description*

These objects are accomplished according to the present invention by the treatment of articles preformed from solid, high molecular weight olefin polymers involving the following general steps:

(A) Applying upon the surface of the preformed article a very thin coating or layer of an acidic substance, selected from the group consisting of:

(a) sulfocarboxylic acids,
(b) organic phosphoric acids,
(c) sulfuric acid or sulfamic acid, and
(d) sulfuric acid precursors, (B) Heating the resulting surface under temperature and time conditions sufficient to imbue said surface with said acidic material, (C) Contacting the surface of the article with an amino compound selected from the group consisting of:

(a) oleophilic amines,
(b) amino silicones,
(c) amino acrylates,
(d) amino acid Werner complexes,
(e) cationic amino-aldehyde resins,
(f) aziridinyl phospine oxides, and
(g) heterocyclic nitrogen compounds, (D) Heating the surface while in contact with said amino compound solution under conditions non-destructive to the article until at least some of the amino compound has exhausted from the solution onto the article, and (E) Recovering an article having the physical appearance of the starting article while being highly receptive to water-soluble dyestuffs of both the anionic and cationic types plus many other anionic and cationic coating and coloring compositions.

The combination of time and temperature conditions imposed upon the article while in contact with the acidic substance and the amino compound is arranged so that such treating reagents will become so associated with the article that the reagent can virtually not be removed without destruction of the preformed article, leaving the article receptive to water-soluble textile dyes, but otherwise substantially unchanged in appearance, strength or other physical properties. Advantageously, the heating steps (A) and (D) as outlined are conducted to heat the surface under treatment to a temperature between about 50° C. and 150° C. If the melting point of the polymer of which the preformed article is formed is less than 160° C., the upper temperature limit will be 10° C. or greater below such melting point.

The contacting of the article surface with the treating reagents may be accomplished in various ways, e.g., spraying, blade coating, roller coating, padding, vapor bath, liquid bath immersion or the like. Advantageously, the acidic substance is applied as a dilute solution, e.g., 0.1 to 10% by weight, in water or volatile organic solvent (solvent with boiling point below about 150° C.) and the wetted surface is then dried by evaporation of the solvent leaving as a residue a thin film of the acidic substance, advantageously, a layer amounting to about 0.001 to 2 grams per square meter of article surface.

Also, a preferred method of applying the amino compound is to use an aqueous solution of about 0.1 to 10% concentration and heat the solution, e.g., to between 50° and 100° C., in contact with the article surface until at least some of the amino compound has been exhausted onto the article.

Times of heating in steps (B) and (D) as outlined are advantageously 0.1 to 120 minutes and preferably 1 to 60 minutes.

Combinations of two or more of the acidic substances or two or more of the amino compounds may be advantageously used in some instances to obtain special effects.

The success of the present invention is due in part to the discovery that the treating agent used for modification of the preformed polyolefin article produces an improvement in the receptivity characteristics of the article that is relatively permanent. In other words, the change in the article creating improved dye receptivity, reduction in static electricity propensities, etc., is not removed by washing, scouring, dry-cleaning, or other normal handling or processing operations to which fibers, films, or other preformed articles of polyolefins would be subjected. At the same time, these treatment procedures do not visibly effect the preformed articles nor detract from the strength or other desirable properties of the articles. Partial or complete penetration of the treating reagent into the fibers, films, or other articles occurs with some of the treating materials while others are restricted to the surface. In any event, the results of the treating procedures contrasts greatly with known behavior of surface coating where the color or other effect obtained by the coating is easily removed by rubbing, by wear or by washing and dry-cleaning processes or where some surface effect is obtained through chemical or molecular change in the polymer of which the surface is formed, e.g., oxidation, sulfonation, molecular rearrangement by high energy irradiation or the like.

The success of the present invention is not only due to the discovery of the unique receptivity modifying effect of certain reagents upon polyolefins, but also the discovery that apparently incompatible classes of reagents can be used in combination to produce an anionic as well as cationic receptivity to the polymers. It has been surprisingly found, for example, that the application of an organic basic material, typically an amino compound as herein defined, when applied to the surface previously treated with an acidic receptivity modifying agent, typically an acidic substance as herein defined, does not destroy the ability of the acidic modified surface to attract and retain cationic materials. This discovery makes it possible to now create preformed articles of polyolefins that are highly receptive to not one, but both, fundamentally different types of coloring materials, namely, both anionic and cationic dye stuffs. The same receptivity, however, extends to pigments, anti-static agents, oil-repellency agents and a host of other coating materials.

*Examples*

A more complete understanding of the new procedures and products of this invention will be obtained from the following reports of actual data on the invention in which all parts or percentages are by weight unless otherwise specified.

*Example 1.*—Samples of a fabric woven in plain weave from yarn spun from staple fibers of polypropylene were padded through an aqueous solution containing 5% by weight of α-sulfolauric acid and 0.5% of a polyethylene oxide wetting agent to give 80% pick-up of solution. Then the samples were dried for 10 minutes at 95° C. and further heated for 15 minutes at 120° C.

The resulting samples were separately placed in exhaustion scouring baths containing individually the following aminated compounds:

(A) 2% of an amidino-formaldehyde resinous condensate.

(B) 2% of a copper complex of a polyamino reaction product of dicyandiamide and diethylene triamine.

(C) 2% of tris aziridinyl phosphine oxide.

(D) 2% of the quaternary amino compound: distearyl dimethyl ammonium chloride.

(E) 2% of rosin amine acetate.

(F) 2% of the Werner chrome complex of N-dodecyl amino propionic acid.

(G) 2% of a cationic amine-formaldehyde polymer.

(H) 2% of a polymer of ethylene imine.

(I) 2% of N-octadecyl ethylene imine.

(J) 2% of distearyl dimethyl hydrazinium chloride.

The individual samples were heated in the above solutions for one hour at 95° C. Then they were removed, rinsed and dried. One half of each sample was then dyed with an anionic acid wool dye, Palatine Fast Green BLNA Conc. CF (C.I. No. 13425). The second half of each sample was dyed with the cationic basic dye, Malachite Green (C.I. No. 42000B).

For each dyeing, there were included the following controls: untreated polypropylene fabric and polypropylene fabric treated only with the sulfolauric acid in the first step of the process. The following results were obtained:

(1) The untreated polypropylene was not colored by either the anionic or the cationic dye.

(2) The sulfolauric treated polypropylene was colored by the cationic dye, but not by the anionic dye.

(3) The sulfolauric and aminated compound treated samples were colored to various depths of shade by both the anionic and the cationic dyes. The colors produced were fast to washing.

*Example 2.*—Separate samples of polypropylene fabric as in Example 1 were treated by padding through one of the aqueous solutions containing each to give about an 80% pick-up of treating liquid:

(a) 1% sulfuric acid+0.5 wetting agent,
(b) 5% butyl phosphoric acid+0.5% wetting agent,
(c) 5% sulfolauric acid+0.5% wetting agent.

The wilted fabric samples were dried for 10 minutes at 95° C. and further heated for 10 minutes at 120° C. The samples were rinsed to remove surplus chemicals and then they were immersed in a solution of 5% of the aminated compound, tris aziridinyl phosphine oxide at a temperature of 50° C. for 30 minutes. After rinsing off unreacted compound, portions of each sample were dyed separately with the following anionic dyes:

(a) Premetalized Acid, Wooncolan Black WA (C.I. No. 15711), (b) Soluble Vat, Algosol Green IBW (C.I. No. 59826).

Other portions of each sample were dyed separately with two cationic dyes, Malachite Green (C.I. No. 42000B) and Crystal Violet (C.I. 52555B).

All of the polypropylene fabric samples, treated first with the acidic compounds and secondly with the aminated compound, were colored by both the anionic and the cationic dyes.

*Example 3.*—Samples of fabric woven from monofilaments of polyethylene were treated with the acidic compound, sulfolauric acid as in Example 1. Then they were separately aftertreated with the following solutions of aminated acrylic monomers:

(a)

| | Percent |
|---|---|
| Dimethylaminoethyl methacrylate | 5 |
| Acetic acid | 5 |
| Isopropanol | 45 |
| Water | 45 |

(b)

| | |
|---|---|
| Dibutylaminoethyl methacrylate | 5 |
| Acetic acid | 5 |
| Isopropanol | 45 |
| Water | 45 |

(c)

| | |
|---|---|
| Acrylic acid amide | 5 |
| Acetic acid | 5 |
| Isopropanol | 45 |
| Water | 45 |

The aftertreated samples were dried, rinsed and then were dyed with four anionic dyes. A second portion of each sample was dyed with the cationic dye, Caribbean Blue (C.I. No. 42140). Untreated samples of the polyethylene fabric were also given the same dyeing treatment with the anionic and cationic dyes. All of the treated samples were dyed deep shades with all of the dyes, while the untreated control samples were either not dyed at all or acquired only a very faint, blotchy tint.

*Example 4.*—Samples of polypropylene fabric were treated with sulfolauric acid as in Example 1. Then they were placed in an aqueous solution containing 5% (based on fabric weight) of the copper chloride complex of dicyandiamide-formaldehyde resin. The samples were heated in this solution for 1 hour at 95° C., rinsed and then were dried. Small portions of the modified polypropylene were dyed with the following anionic and cationic dyestuffs:

Wooncolan Blue, C.I. No. 42045
Palatine Fast Green BLNA, C.I. No. 13425
Wooncolan Orange, C.I. No. 18870
Superlitefast Red 3BL, C.I. No. 29225
Algosol Red IFBB-CF, C.I. No. 67001
Algosol Green IBW-CF, C.I. No. 59826
Algosol Golden Yellow IGK, C.I. No. 59101
Hidaco Violet, C.I. No. 42555
Hidaco Basic Red, C.I. No. 26105
Hidaco Basic Yellow, C.I. No. 11160.

All samples of the modified polypropylene fabrics were colored to various depths of shade by the above dyes. Dry-cleaning and wash tests also showed that the colors were fast and did not rub off or crock.

*Example 5.*—Samples of polypropylene film were wetted with an isopropanol solution containing 5% of diisooctyl phosphoric acid. Then they were dried for 15 minutes at 105° C. The organic phosphoric acid treated films were placed in an aqueous solution containing 5% of N-dodecyl propylene diamine acetate. After stirring in this solution for 30 minutes at 95° C., the samples were rinsed and dried.

One half of the film was treated with a 3% aqueous solution of the cationic Werner chrome complex of perfluorooctanoic acid by dipping in the solution at 20° C. The second half was treated with 3% of the anionic ammonium salt of perfluorooctanoic dissolved in water. After drying, the samples were scoured to remove unfixed material. In both cases, the films were found to be highly oil repellant. When the two fluorocarbon compounds were applied to unmodified polypropylene film and scoured, no oil repellency was formed.

Discussion of details

Various materials may be used as the polyolefin receptivity modifying agents in carrying out the new polyolefin treatments. Details of this phase of the matter as guidance to the person skilled in the art carrying out the invention are given below. More detailed information on specific modifying agents is contained in the aforesaid patent applications, the disclosures of which are incorporated herein by reference.

As to the sulfocarboxylic acids, it is advantageous to use free acids, or partial salts thereof, that have a molecular weight between about 140 and 1000 and preferably between about 200 and 800. The acid should contain a $-SO_3H$ group, which may appear in the free acid form or as a partial salt thereof, and also contain a non-polar hydrocarbon group containing at least two carbon atoms and preferably between about 10 and 20 carbon atoms.

A preferred group of sulfocarboxylic acids for use in carrying out the new processes of this invention are those having the general formula:

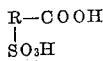

wherein R is an alkyl, aralkyl, aryl or cycloalkyl radical containing at least one carbon atom, typically (1–18) carbon atoms.

Typically sulfocarboxylic acids which perform in this process are:

α-sulfostearic acid
α-sulfopalmitic acid
α-sulfolauric acid
3-sulfocaproic acid
6-sulfohexoic acid
3-sulfobenzoic acid
3-sulfophthalic acid
4-sulfophthalic acid
4-sulfosalicylic acid
α-sulfoacetic acid
5-sulfo-2-naphthoic acid
1-sulfo-2-naphthoic acid
5-sulfo-1-hydroxy-20-naphthoic acid
5-sulfo naphthalic acid
2-sulfo-3-phenyl propionic acid
2-sulfo-hexahydrobenzoic acid
4-sulfo hexahydrosalicylic acid
2,12-disulfostearic acid
α-cyclohexyl-α-sulfo acetic acid As to the organic phosphoric acids, the preferred acids have the following general formula:

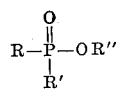

wherein

R is an alkyl, cycloalkyl, aryl, alkoxy, cycloalkoxy, or aryloxy radical, especially such radicals containing 2 to 20 carbon atoms, and R' is a hydroxy radical or an alkyl, cycloalkyl, aryl, alkoxy, cycloalkoxy or aryloxy radical, especially such organic radicals containing 2 to 20 carbon atoms, and R'' is hydrogen or

Specific examples of useable organic phosphoric acids include:

chloromethyl phosphonic acid
butyl acid orthophosphate
dibutyl acid pyrophosphate
mono-dibutyl acid orthophosphate
mono-diethyl acid orthophosphate
ethyl acid orthophosphate
iso-octyl acid pyrophosphate
isopropyl acid orthophosphate
dioctyl acid orthophosphate
dimethyl acid pyrophosphate
di-2-ethylhexyl phosphoric acid
mono-lauryl acid orthophosphate
benzyl phenyl phosphoric acid
cyclohexyl phosphoric acid
naphthyl phosphoric acid
phenyl phosphonic acid When sulfuric acid or sulfamic acid are employed as the acidic surface modifying agent, they are applied to the polyolefin surface as a dilute solution, e.g., 0.1 to 5% weight concentration. Preferred results are obtained when the dilute acid solution also contains a polyoxy compound also in dilute concentration, i.e., 0.1 to 5%. Polyalkylene oxide materials having the following general formula are advantageously used as the polyoxy compound:

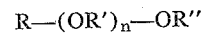

wherein

R and R'' are hydrogen, alkyl, aryl and/or acyl radicals,
R' is an alkylene radical of 2 to 6 carbon atoms, and
n is an integer from 2 to about 1,000, with R, r' and n being chosen to provide a substance having a solubility of at least 1 part in 1000 parts of water at about 20° C. Typically R is hydrogen, and R'' is hydrogen or a 2 to 18 carbon atom alkyl, aryl or acyl radical.

The following list is exemplary of polyalkylene oxide materials which may be used in treating polyolefin articles in accordance with the invention. Mixtures of two or more such materials may be used in the procedures or a plurality of such reagents may be applied in separate treating steps.

polyethylene oxide (mol. wt. 1000)
diethylene glycol
diethylene glycol monostearate
diethylene glycol monobutyl ether
diethylene glycol monoethyl ether
polyethylene glycol monolaurate
diethylene glycol monobutyl ether acetate
dibutylene glycol
hexamethylene glycol dihydroxy hexyl ether
pentamethylene glycol dihydroxyethyl ether
poly 2,3-hexanediol
ethyl benzyl polyethylene glycol ether
octyl phenoxy diethoxy ethanol
hexyl phenyl polyethylene glycol ether
amyl tolyl dibutoxy butanol
polyoxyethylated nonyl phenol
polyoxyethylene esters of mixed fatty and resin acids
glyceryl mono-oleate
polyoxy ethylene ether of mixed fatty alcohols Instead of using dilute sulfuric acid, sulfamic acid and precursors of sulfuric acid which give rise to sulfuric acid in aqueous solution and at temperatures between about 50° and 100° C. may be used. Examples of useable materials of this class include:

sodium bisulfate and
ammonium sulfamate

With respect to the amino compounds, one important group of such substances are oleophilic amines, i.e., amines having a molecular weight at least 100 and containing a non-polar hydrocarbon group of at least six carbon atoms. Advantageously, the amino compound has a molecular weight less than 800, preferably 150 to 600, and the hydrocarbon group contains between 12 and 18 carbon atoms.

A preferred group of amines for use in carrying out the new processes of this invention are those having the formula:

wherein $R_1$ is an alkyl, aryl or cycloalkyl radical containing at least 6 carbon atoms, $R_2$ is a hydrogen, alkyl, aryl, cycloalkyl, alkylene radicals, or an alkylene carboxylic radical, i.e., —R—COOH, $R_3$ is a radical selected from the group consisting of

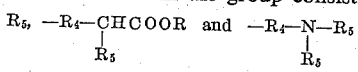

which together with $R_2$ may complete a heterocyclic ring, $R_4$ is a divalent radical selected from the group consisting of alkylene, arylene, cycloalkylene, and polyamino polyalkylene, and $R_5$ is a hydrogen, alkyl, aryl, alkylene or cycloalkyl radical.

Specific examples of useable amines are the following:

Alkyl monoamines:
    Hexylamine
    Dodecylamine
    N-methyl dodecylamine
    Octadecylamine
    Tallowamine
    Hydrogenated tallowamine
    N-ethyl octadecylamine
    N-carboxypropyl dodecylamine
    Dioctadecylamine
    N-carboxymethyl octadecylamine
    N-dodecyl lysine
    N-hexadecyl leucine
    Triacontanylamine
    N-hydroxypropyl octadecylamine
    N-carbethoxy octadecylamine
    N-carboxyphenyl octadecylamine Cycloalkyl amines:
    Cyclohexylamine
    Rosin amine
    Dicyclohexylamine
    2-octyl cyclohexylamine
    N-cyclohexyl ethylene diamine Alkyl polyamines:
    N-dodecyl ethylene diamine
    N-dodecyl propylene diamine
    N-octadecyl N'-methyl propylene diamine
    N-octadecyl ethylene diamine
    N-hexyl propylene diamine
    N,N-dioctyl N'-octadecyl propylene diamine
    N-aminopropyl hexadecylamine
    Docosanyl ethylene diamine
    N-hydroxyethyl N'-dodecyl propylene diamine
    N-dodecyl diethylene triamine
    N-octadecyl tetraethylene pentamine Aryl amines:
    N-ethyl aniline
    N-methyl benzylamine
    Napthylamine
    N-dodecyl aniline
    N-4-diphenyl octylamine
    N-hexyl N-4-hydroxyphenyl aniline
    N-carbethoxy naphthylamine
    N,N-dihexyl aniline
    N-phenyl N-4-chlorophenyl octylamine
    N-phenyl propylene diamine
    N-phenyl N'-dodecyl ethylene diamine
    N-benzyl N-octadecyl diethylene triamine
    N-aminopropyl naphthylamine
    N-carboxypropyl N'-dodecyl N'-phenylethylene diamine In addition to the amines per se, salts of the amines and quaternary ammonium compounds formed therefrom by conventional reactions may be used in carrying out the new operations, e.g., distearyl dimethyl ammonium chloride and distearyl dimethyl hydrazinium chloride. Also, adducts and complexes of the amines which exhibit a basic reaction due to the presence of a basic amino group may be used, e.g., the copper complex of a polyamino reaction product of dicyandiamide and diethylene triamine.

A large number of amino silicones are now available commercially and these materials, as well as other equivalent materials subsequently available, are generally contemplated for use as amino compounds in conducting the new procedures. Such materials can be made by polymerization of silicone compounds containing amino groups. Examples of such materials that may advantageously be used are:

aminopropyl triethoxysilane
aminobutyl methyl, diethoxysilane
aminoethylaminopropyl methyl diethoxysilane
aminobutyl methylsilicone homopolymer
aminosilicone copolymer Amino acrylate monomers and polymers are commercially available and are generally contemplated as a class for use with this invention. Examples of such materials that may advantageously be used are:

dimethylaminoethylene methacrylate
dibutylaminoethylene methacrylate
dihexylaminomethyl methacrylate
dihexylaminoethyl acrylate
diethylaminoethyl acrylate
N-hexyl-N-hydroxyethyl aminoethyl acrylate The Werner chrome complexes of amino acids for use with this invention are formed from acids containing at least 6 carbon atoms and may be represented by the following general formula:

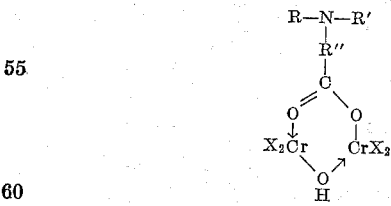

wherein

R is an alkyl or alkenyl radical containing at least 6 carbon atoms,

R' is a hydrogen, alkyl, cycloalkyl, aryl, or carboxyalkyl radical,

R" is an alkylene, aralkylene, or aminoalkylene radical, and

X is a halogen radical, particularly chlorine.

The following list is exemplary of the amino acids from which Werner chrome complexes may be formed to be used in treating polyolefin articles in accordance with the invention:

N-octadecyl glycine
N-dodecyl alanine

N-octyl phenylalanine
N-octadecyl proline
N-dodecyl lysine
N,N'-dioctyl lysine
N-octadecyl,N-carboxypropyl glycine
N,N-bis carboxypropyl octyl amine
N-hexadecyl leucine
N,N-dihexyl alanine
N-methyl,N-carboxyethyl stearyl amine
N-dodecyl-2-phenyl proline
N-octadecyl,N-cyclohexyl glycine
17-carboxy distearyl amine The cationic amino-aldehyde resins are also contemplated as a class to be useable in conducting the new polyolefin surface treatments as described. Such materials may be used in the substantially monomeric form, typically a dimethylol compound, or in a state of polymerization where the resin is still substantially soluble in water, i.e., soluble to an extent of at least about 1 gram per 100 cc. of water. Commercially available materials of this class are often of undetermined structure and undisclosed composition. Anyone skilled in the art will be able to ascertain, however, by simple testing, using the information supplied by this disclosure whether a particular cationic aminoaldehyde resin, or any other of the contemplated amino compounds for that matter, are serviceable. By way of guidance and exemplification, the following amino-aldehyde resins may be advantageously used:

Copper chloride complex of dicyandiamide-formaldehyde resin
Amidino-formaldehyde condensate
Cationic amine-formaldehyde polymer
N,N'-dimethylol 1,3-propylene guanidine
N,N'-dimethylol aminoethylene urea The aziridinyl phosphine oxides are also a commercially available group of materials that may be used as amino compounds for conducting the second stage of the new polyolefin surface treatments. Specific examples of this type material which are preformed include:

tris aziridinyl phosphine oxide
tris methylaziridinyl phosphine oxide
tris phenylaziridinyl phosphine oxide
tris aziridinyl phosphine sulfide
tris aziridinyl triazine Specific examples of heterocyclic compounds which have a molecular weight between 100 and 800 and which contain a basic amino group useable as the anionic exhaustion agents include:

diphenylacetylene diguanidine
1-octadecenyl-3-hydroxyethyl imidazoline
1-dodecyl imidazoline
N-dodecyl morpholine
3-octyl pyrrolidine
1-hexyldecyl imidazoline
5-octadecyl pyrimidine
2,3-dihexyl pyrazine
2-phenyl-3-dodecyl pyridine
N-octadecyl ethylene imine The acidic material used in the primary stage of the new polyolefin treatments appears to imbue the polymer surface, and possibly to some extent the polymer body, by thermal diffusion. The amino substance, on the other hand, appears to coordinate or complex with the prior established acidic material for some of the amino materials, e.g., the quaternary ammonium compounds, cannot impart any durable anionic receptivity in the absence of prior treatment with the acidic material. Still, surprisingly the cationic receptivity provided by the acidic material treatment is not destroyed by the subsequent exhaustion of the amino compound onto the polyolefin surface.

The application of the acidic receptivity modifying agent can be by impregnation, spraying, coating, contact with liquid bath or other suitable fashion. Also contemplated is application of the cationic agent in the vapor or liquid form including solutions in organic solvents, aqueous dispersions or emulsions, as a component of molten bath, or from solubilizing systems using salts or other compounds.

The durable attachment of the treating reagents upon the polyolefin articles is accomplished by heating the article in contact with the treating reagent to elevated temperatures, i.e., 50° to 250° C. for a period of about 0.1 to 120 minutes, preferably, 100° to 150° C. and 1 to 15 minutes, depending to some extent upon the degree of modification desired and other considerations. The higher the temperature, normally the less time is required for the predetermined degree of modification to be attained. Temperatures up to about 10° C. below the melting point of the polymer are useable. This thermal diffusion phase of the treating methods may be effected by other ways than direct heating, e.g., flash diffusion of the treating agent under pressure or in the presence of superheated steam, use of radiant energy or the like.

Polyolefins made by different processes may have different degrees of crystallinity and orientation and may contain different heat stabilizers and other additives. Hence, the precise conditions of reagent application and thermal treatment may have to be revised for different polymers, e.g., changes in chemical concentrations, heating times and temperatures, dyeing cycles, and the like.

After the treatment of the polyolefin article with the treating reagent, it is normally desirable to remove surplus reagent. Such surplus removal, particularly in the case of fibers and textiles, is typically carried out by scouring the article to remove the loosely held treating reagent. For this purpose, conventional textile scouring techniques, dry-cleaning techniques or the like may be employed. Such cleaning procedures are generally followed by rinsing or drying, but the treatment procedure may be immediately followed by subsequent steps without cleaning the surplus treating agent from the article surface. This is particularly true where the surplus would have no detrimental effect upon dyeing, coloring, printing or subsequent coating compositions. Neutralizing agents may be used to advantage in such residue removal operations.

The dyeing of treated polyolefin fibers, fabrics, films or the like following the surface modification thereof may be carried out with either cationic or anionic dyes in conventional manners common to the art of dyeing textile in machines such as the jig, beck, pad-steam range and pressure dyeing equipment. The conventional dyeing assistants, such as level agents, wetting agents, alkali salts, dye fixing agents, copper salts, chromium salts, etc., may be used in the process to produce uniform dyeing or to improve lightfastness, washfastness or the like as desired. In addition to dyeing, the polyolefin articles treated in accordance with the invention may be finished with a host of other coating or finishing compositions to create on the polyolefin article finishes, ornamentations or the like which are durable to washing, dry-cleaning or other handling. Such finishing materials may be, for example:

(1) Anionic or cationic pigments
(2) Water repellents
(3) Biocidal agents
(4) Adhesive resins
(5) Phosphorous compounds
(6) Fluorocarbon latices
(7) Acrylic latices
(8) Premetalized dyes
(9) Polyvalent metal salts
(10) Soil repellents
(11) Water repellents
(12) Oil repellents
(13) Flame repellents
(14) Laminating adhesives

(15) Anti-static agents
(16) Textile softeners
(17) Adhesives
(18) Printing inks Broadly stated, materials to which polyolefins are rendered receptive by the new treatments include those containing sulfonic, carboxyl, phosphoric, ketonic and phenolic groups, e.g., sulfomethylated polyacrylamides, polyacrylic acid, polyvinyl pyrrolidone, acrylic acid copolymers, phenol-formaldehyde resins, epoxy resins, polyamide resins, organic phosphoric acids, polyester resins, alkyd resins, carboxymethyl cellulose, sodium alginate, perfluoroacids, rosin, pigment binders, and silica sols.

In the coloring of the new forms of treated polyolefin articles, dyeings are generally done in an excess of dye solutions. Dyebaths typically will contain about 1–2% of the dye based on the weight of the fabric and dyeing may be conducted with a bath/fabric ratio of about 10:1 to 100:1. Other conventional conditions used in dye operations may be employed. In the case of textile materials, the modified, treated fabric may be colored by padding through a bath of the dyestuff followed by drying of the colored material. Alternatively, the modified textile material may be printed with dye-printing systems utilizing conventional techniques.

Typical dyes that may be used to color the new treated polyolefin articles include:

Malachite Green—C.I. No. 42000
Basic Yellow 3—C.I. No. 41005
Regina Purple—C.I. No. 42515
Basic Red—C.I. No. 42500
Basic Blue—C.I. No. 51180
Calcozine Red—C.I. No. 50240

In addition to the improvements in dyeing of polyolefins which can be attained by the new treatment operations, it has been found that such treatment also leads to coloration of the treated polyolefin with water-insoluble, non-ionic pigments which normally do not adhere to the polyolefin surface. Examples of such pigments, in addition to non-reduced vat dyes, phthalocyanines, benzidines, chrome oxides, iron oxides, carbon black, coupled naphthols, titanium oxide, cobalt salts and the like. The specified receptivity modifying agents may be used as the sole binding agents for the pigments or they may be used with conventional binders to improve the adhesion to the polyolefin. The binding of water-insoluble pigments to polyolefin fiber and films has utility in the use of printing inks, labeling and production of decorative effects.

The receptivity modifying agents may be used in undiluted form, but more satisfactorily it is dissolved in some suitable solvent which may include organic solvents such as hydrocarbon solvents, alkanols, dialkyl ethers, esters or the like. Various concentrations of the treating compound relative to the polyolefin may be employed. For example, in a padding method of applying the treating material from a solution, satisfactory results may be obtained by the deposition of about 0.1 to 10% by weight of treating agent based upon the weight of the polyolefin. Deposition of between about 0.5 and 2% by weight of the treating compound has been found to be particularly useful.

Where the agents are applied as solutions, various concentrations may be used. For example, in a padding method of applying the compound from aqueous, alcoholic or solvent solutions of about 0.1 to 10% concentration, good coloration of the polyolefin fibers may be obtained within the limits of from 0.01 to 10% deposited compound. If only light shades are desired, then the lower concentrations of compound are most economical to use. In general, the amount deposited is determined by the depth of shade required for a particular type of dye.

The treatment of the polyolefin materials may be carried out at any suitable stage. For example, in the case of continuous filaments, the treatment with the organic phosphoric acids may be accomplished immediately after spinning. In the case of yarns made of spun staple fibers, the treatment can be effected before the yarns are formed by operation upon the staple fiber or after formation of the yarn. Alternatively, fabrics can be woven from untreated monofilaments or spun yarn, after which they can be subjected to the new treatments and then dyed, colored, coated or subjected to other operations. This gives great flexibility to manufacturers and users of polyolefin fibers, films or other articles. For example, it enables the manufacturers of filaments and films to produce one commodity, rather than a whole series of modified materials, since, using the procedures of this invention, treatment of the polyolefin articles to make them receptive to dyeing or other coating operations can be conducted at the plant of the fabric manufacturer. Also, the new operations enable the textile processor or manufacturer to utilize the advantages of the new operations without making large investments in special processing equipment or in special training of personnel.

The various types of olefin polymers which may be treated in accordance with the invention are extensively described in the patent and technical literature, e.g., see "Encyclopedia of Chemical Technology," first supplement volume (1957), pp. 699–712 and second supplement volume (1960), pp. 661–672.

The new polyolefin treatment procedures are applicable both to homopolymers of olefins and interpolymers of olefins with unsaturated hydrocarbons or other polymerizable materials resulting in solid polymers that are incapable of being satisfactorily dyed or coated because of the general inertness of the polymer. Obviously, the new procedures are of particular importance in the treatment of fiber-forming polymers such as fiber-forming polyethylene, polypropylene or other homopolymers or copolymers of 2–6 carbon atom $\alpha$-olefins. The Textile Fiber Products Identification Act (Public Law 85–897), defines olefin fibers as "any manufactured fiber in which the fiber-forming substance is a long chain synthetic polymer composed of at least 85% by weight of ethylene, propylene or other olefin units." The new treatments of this invention are contemplated for use in connection with all olefin fibers as so defined.

Modification of polyolefins by inclusion of the treating reagents of the invention into the polymer before formation of the ultimate preformed article is contemplated, e.g., by applying the receptivity modifying agents to molding powder.

The treatment operations of the invention may be used for modification of olefin fibers when they constitute a portion of blended fabrics, e.g., when the fabrics are woven in admixture with polyester fibers, nylon fibers, silk fibers, cotton fibers or the like. On the other hand, it may be preferable to treat the olefin fibers prior to the weaving, knitting or other fabrication of the blended fabric, particularly where blended fabrics having multiple dye substantive properties are to be processed.

For special applications, the treating reagent, may be applied simultaneously with the spinning, extrusion or other formation of the fibers, films, rods or the like. Again, use of about 0.1 to 5% of the treating agent relative to the total weight of the polyolefin material is satisfactory to produce adequate dye receptivity, decrease in static electric propensities or the like.

The new treatments as above described make possible the coloration of fibers, films, rods, sheets and other preformed articles of solid olefin polymers with conventional dyestuffs which normally do not adhere to or dye the polymer surfaces. Such surface modification of the olefin polymers also has utility in the use of printing inks, labeling and production of other decorative effects. In addition, the operations render the olefin polymer surfaces less electrostatic, more receptive to laminating adhesives, more receptive to pigments, paints and other coating compositions, more receptive to fluid-repellent agents and the like.

I claim:
1. A process of coloring fabric made of polypropylene fibers which normally are not dyeable with water-soluble dyes which comprises:
   (A) padding onto the fabric an aqueous solution consisting essentially of about 5% α-sulfolauric acid to give a pick-up of between about 20 to 100% of the solution,
   (B) drying the fabric to leave thereon as a uniform surface layer the residue of sulfolauric acid,
   (C) heating the dried fabric at about 120° C. for about 15 minutes,
   (D) immersing the resulting fabric at about 95° C. for about 1 hour in an aqueous 2% solution of tris aziridinyl phosphine oxide,
   (E) rinsing and drying the fabric, and
   (F) dyeing the fabric with an anionic acid wool dye.
2. A process of treating preformed articles formed of high molecular weight solid olefin polymer which comprises:
   (A) applying to the surface of the preformed article as a thin uniform layer, amounting to about 0.001 to 2 grams per square meter of article surface, of an acidic material selected from the group consisting of:
      (a) sulfocarboxylic acids,
      (b) organic phosphoric acids,
      (c) sulfuric acid, and
      (d) sulfuric acid precursors,
   (B) heating the article surface with said applied acidic material to a temperature at least 10° C. below the melting point of the olefin polymer between 50° and 150° C. for between about 0.1 to 120 minutes to imbue said surface with said acidic material,
   (C) contacting the acidic material imbued article with a solution containing between about 0.1 to 25% by weight of an amino substance selected from the group consisting of:
      (a) oleophilic amines,
      (b) amino silicones,
      (c) amino acrylate polymers,
      (d) Werner complexes of amino acids,
      (e) amino-aldehyde resins,
      (f) aziridinyl phosphine oxides,
      (g) heterocyclic nitrogen compounds,
   (D) heating said article in contact with said solution for between about 1 to 120 minutes at a temperature at least 10° C. below the melting point of the olefin polymer between 50° and 150° C. until some of said amino substance has been exhausted onto the article surface, and
   (E) recovering from said solution a treated preformed article of said olefin polymer which is sufficiently receptive to both anionic and cationic dyestuffs to permit said treated article to be dyed in deep-shades from aqueous solutions of the dyestuffs using conventional dyeing techniques.
3. A process as claimed in claim 2 wherein said application of said acidic material is made by coating the surface of the preformed article with a solution of the acidic material in a volatile solvent and then drying the wetted article by evaporation of the solvent leaving a residue film of the acidic material upon said article surface.
4. A process as claimed in claim 3 wherein said solution contains about 0.1 to 5% of the acidic material and between about 10% to 200% by weight based upon the weight of the article of the solution is coated upon the article.
5. A preformed article made of high molecular weight solid olefin polymer that may be dyed in deep shades with aqueous dyebaths of both anionic and cationic dyes because the surfaces thereof are imbued with the following two materials, each in the amount of between about 0.001 to 2 grams per square meter of article surface:
   (A) acidic material selected from the group consisting of:
      (a) sulfocarboxylic acids, and
      (b) organic phosphoric acids,
   (B) amino substance selected from the group consisting of:
      (a) oleophilic amines,
      (b) amino silicones,
      (c) amino acrylate polymers,
      (d) Werner complexes of amino acids,
      (e) amino-aldehyde resins, and
      (f) aziridinyl phosphine oxides,
      (g) heterocyclic nitrogen compounds.
6. A process for improving the surface receptivity to dyestuffs of a preformed article composed of solid polyolefin which comprises:
   (A) applying to the surfaces of said article an aqueous composition containing a mixture of about 0.1 to 5% sulfuric acid and about 0.1 to 5% of a polyalkylene oxide material having the formula

$$R-(OR')_n-OR$$

wherein:
      (1) R is a radical selected from the group consisting of hydrogen, alkyl, aryl and acyl,
      (2) R' is an alkylene radical of 2 to 6 carbon atoms, and
      (3) $n$ is an integer between about 2 and 10,000,
   (B) heating the article with the applied acid mixture to an elevated temperature between about 10° C. below the melting point of said polyolefin and between 50° C. and 150° C. for about 1 to 60 minutes,
   (C) washing the heat treated surface with water to remove any excess portion of the treating material of step (A) not set upon the article surface by the step (B) to prevent the material from being removed by the washing step,
   (D) immersing the resulting article in an aqueous solution containing about 1 to 10% by weight of tris aziridinyl phosphine oxide at a temperature between about 50° and 100° C. for between about 1 to 60 minutes until some of said oxide had been exhausted from the solution onto the article, and
   (E) recovering the polyolefin article having improved receptivity to both anionic and cationic dyestuffs.
7. An article having improved receptivity to both anionic and cationic dyestuffs prepared by the process of claim 6.
8. A process of improving the ability of the surface of a preformed article composed of solid polyolefin to retain both anionic and cationic dyes applied thereto which comprises:
   (A) contacting said article with a dilute aqueous mixture of sulfuric acid,
   (B) heating the article in the presence of said mixture to a temperature between about 50° C. and about 10° C. below the melting point of the polyolefin for about 1 to 120 minutes,
   (C) contacting the surface of the article with an aqueous solution of an aziridinyl phosphine oxide,
   (D) heating the article surface and the contacting aqueous solution to a temperature at least 10° C. below the melting point of the solid polyolefin between 50° C. and 100° C. for about 1 to 60 minutes,
   (E) removing any excess of said aqueous solution from contact with said article surface, and
   (F) recovering the resulting polyolefin article having sufficient receptivity to both anionic dyes and cationic dyes to be dyed in deep shades with either such type of dye from aqueous solutions thereof.
9. Polyolefin fibers which consist essentially of homopolymer of a 2 to 6 carbon atom olefin having the surface thereof imbued with such between about 0.001 to 2 grams per square meter of at least two different oleophilic substances, said fibers presenting no visibly detectable difference from the same fibers free of such oleophilic substances, the surface polymer as well as the subsurface polymer of said fibers containing only carbon and hydrogen atoms, each of said oleophilic substances containing different polar substituents, the fibers being distinguished from normal fibers of olefin homopolymers by being capable of exhausting both anionic and cationic dyes from aqueous solutions thereof to dye the fibers in deep shades using conventional dyebaths and dyeing techniques.

10. A preformed article consisting essentially of high molecular weight solid olefin polymer, the polymer throughout said article being the same and containing only carbon and hydrogen atoms, the surfaces of said article containing material other than said polymer, said other material being chemically unreacted with said polymer and being present in the amount of between 0.001 and 2 grams per square meter of article surface, said other material being durably affixed to said article surface whereby the material is fast against washing and dry-cleaning, said article being characterized by such receptivity to both anionic and cationic water-soluble dyes that the article may be dyed in deep shades by aqueous solutions consisting of such dyes and water.

11. A process of coloring preformed articles formed of high molecular weight olefin polymer which comprises:
(A) applying to the surface of the preformed article as a thin uniform layer, amounting to about 0.001 to 2 grams per square meter of article surface, of an acidic material selected from the group consisting of:
  (a) sulfocarboxylic acids,
  (b) organic phosphoric acids,
  (c) sulfuric acid, and
  (d) sulfuric acid precursors,
(B) heating the article surface with said applied acidic material to a temperature at least 10° C. below the melting point of the olefin polymer between 50° and 150° C. for between about 0.1 to 120 minutes to imbue said surface with said acidic material without chemically reacting the applied acidic material with the polymer of which the article is formed.
(C) contacting the acidic material imbued article with a solution containing between about 0.1 to 25% by weight of an amino substance selected from the group consisting of:
  (a) oleophilic amines,
  (b) amino silicones,
  (c) amino acrylate polymers,
  (d) Werner complexes of amino acids,
  (e) amino-aldehyde resins,
  (f) aziridinyl phosphine oxides,
  (g) heterocyclic nitrogen compounds,
(D) heating said article in contact with said solution for between about 1 to 120 minutes at a temperature at least 10° C. below the melting point of the olefin polymer between 50° C. and 150° C. until some of said amino substance has been exhausted onto the article surface, and
(E) immersing the treated article in an aqueous solution of a dye containing about 1 to 2% water-soluble dye at a temperature between about 50° to 100° C. for sufficient time for dye to exhaust upon the treated article and color it to a deep shade.

12. A process of improving the surface receptivity of preformed articles of solid polyolefins to water-soluble substance selected from the group consisting of anionic and cationic dyes, finishing materials and coating materials which comprises:
(A) immersing a preformed article made solely of a solid high molecular weight isotactic homopolymer of an olefin of 2 to 6 carbon atoms in a solution containing between about 1 to 10% of an organic phosphoric acid of the general formula:

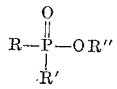

wherein:
  (1) R is an alkoxy radical of 6 to 20 carbon atoms,
  (2) R' is a radical selected from the group consisting of hydroxy, 6 to 20 carbon atom alkyl and 6 to 20 carbon atom alkoxy, and
  (3) R" is a radical selected from the group consisting of hydrogen and

(B) removing the article from said solution and heating the article to a temperature at least 10° C. below the melting point of said homopolymer between 50° C. and 150° C. until the surface of the article is imbued with at least some of the organic phosphoric acid remaining thereon upon removal from said solution,
(C) removing any excess organic phosphoric acid from said article,
(D) immersing the article from step (C) in an aqueous solution containing between about 1 to 10% of an acid salt of an oleophilic amine having a molecular weight of between 100 and 800 containing a nonpolar hydrocarbon group containing between 12 and 18 carbon atoms,
(E) heating the article to a temperature between about 50° C. to 100° C. for about 1 to 60 minutes until at least some of the oleophilic amine has been exhausted onto the surface of said article,
(F) removing the article from the solution of step (D) and cleansing any excess of said solution from the article, and
(G) drying the article.

13. A process of improving the surface receptivity of articles of solid polypropylene to both anionic and cationic substances which comprises:
(A) wetting an article of solid polypropylene with an isopropanol solution containing 5% of diisooctyl phosphoric acid,
(B) drying the article for 15 minutes at 105° C.,
(C) placing the article from step (B) in an aqueous solution containing 5% of N-dodecyl propylene diamine acetate,
(D) heating the article in said solution at 95° C. for 30 minutes, and
(E) removing the article from said aqueous solution, rinsing it and drying it.

References Cited by the Examiner
UNITED STATES PATENTS

| | | | |
|---|---|---|---|
| 2,368,690 | 2/1945 | Tschudin | 8—31 |
| 2,458,397 | 1/1949 | MacGregor | 8—31 |
| 3,031,332 | 4/1962 | Rothacker | 117—47 |
| 3,033,704 | 5/1962 | Sherrill et al. | 117—47 |
| 3,039,840 | 6/1962 | Sawaya | 8—55 |
| 3,098,692 | 7/1963 | Gagliardi | 8—55 |
| 3,145,073 | 8/1964 | Gagliardi | 8—100 |
| 3,148,017 | 9/1964 | Gagliardi | 8—55 |
| 3,150,917 | 9/1964 | Gagliardi | 8—55 |
| 3,151,928 | 10/1964 | Cappuccio et al. | 8—55 |
| 3,153,680 | 10/1964 | Giustiniani et al. | 8—55 X |
| 3,169,823 | 2/1965 | Gagliardi | 8—55 |

NORMAN G. TORCHIN, *Primary Examiner.*

J. HERBERT, *Assistant Examiner.*